Patented June 12, 1923.

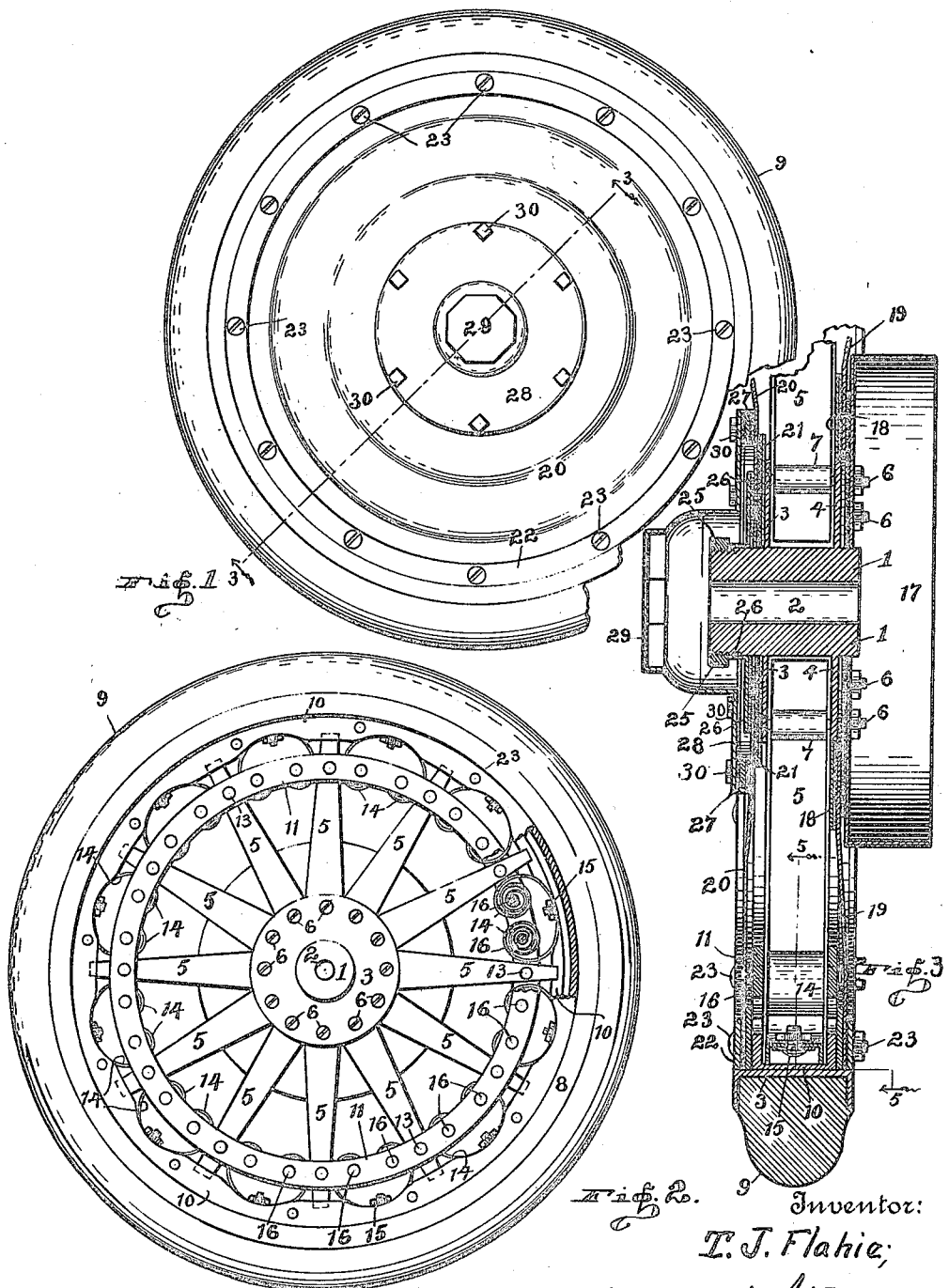

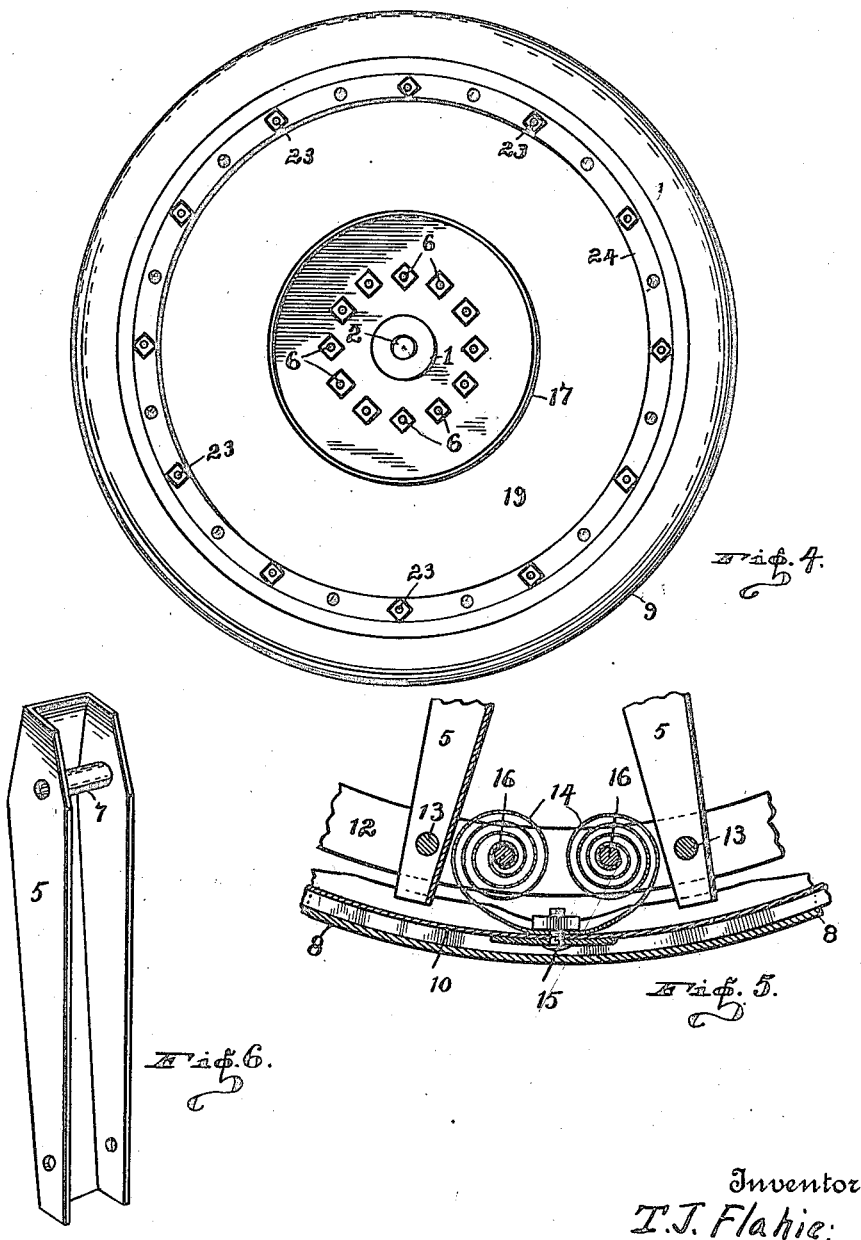

1,458,175

UNITED STATES PATENT OFFICE.

THOMAS J. FLAHIE, OF PENNVILLE, INDIANA.

VEHICLE WHEEL.

Application filed July 1, 1921. Serial No. 481,926.

*To all whom it may concern:*

Be it known that I, THOMAS J. FLAHIE, a citizen of the United States, residing in the town of Pennville, in the county of Jay, State of Indiana, have invented new and useful Improvements in Vehicle Wheels, of which the following is a full, clear, and comprehensive specification and exposition, the same being such as will enable others to make and assemble the same with exactitude.

The object of my present invention is to provide a double-disc wheel and having means for making the wheel resilient located between the discs whereby the wheel will be entirely self contained, with the parts so constructed and arranged that the wheel will be equal resiliently, or superior to the ordinary pneumatically equipped wheels.

Broadly stated my object is to provide a spring wheel which will afford a maximum of resiliency in practice, will be strong and durable in construction, simple in character, easily repaired if occasion should arise, and which can be manufactured and sold at a comparatively low price.

Other objects and particular advantages of the invention will suggest themselves in the course of the following description, and that which is new will be correlated in the appended claims.

The preferred means for carrying out the objects of my invention in a practical and efficient manner is shown in the accompanying drawings, in which—Figure 1 is an outside or face elevation of the complete wheel as constructed in accordance with my invention.

Figure 2 is an inside view, the outer disc being removed. Figure 3 is a central cross section of one part of the wheel. Figure 4 is an elevation of the inner side of the complete wheel. Figure 5 is a detail section, as taken on the line 5—5 of Figure 3. And Figure 6 is a perspective view of one of the spokes alone.

Similar indices denote like parts throughout the several views.

In order that the construction, the operation, and the advantages of my invention may be more fully understood and appreciated I will now take up a detailed description in which I will set forth the several parts as fully and clearly as I may.

Referring now to the drawings in detail:

The wheel includes a solid hub 1 having a central aperture 2 formed therethrough for the axle, not shown.

Spaced apart and radiating out from the hub 1 are the two hub flanges 3 and 4, between which are located the inner ends of the spokes 5, the same being U-shaped in cross section and they are formed tapering, substantially as shown in Figure 6. The spokes 5 are secured to the hub flanges each by a bolt 6. A spacer collar 7 is provided for each bolt, they being located between the sides of the spokes, as shown in Fig. 3; and the bolts 6 extend therethrough whereby the sides of the spokes can not be sprung toward each other but are retained tight in place in the hub as shown.

Numeral 8 denotes the main or outer rim of the wheel, the same has outward turned flanges, and it is adapted to carry the solid rubber tire 9, or any other style of tire desired.

Located inside the rim 9, contacting therewith, and having inwardly extending flanges on its edge, is the inner rim 10.

Numeral 11 denotes the outer spoke-ring, and 12 the inner spoke-ring, the two being of the same size and identical with each other, and they are rigidly secured to the respective outer and inner sides of the spokes, each by a rivet 13, and the spokes extend out beyond said rings to and between the flanges of the inner rim 10; substantially as shown in Fig. 5.

One of the essential and particularly novel features of this invention resides in the double coil-springs 14, there being one of said springs located between the outer portions of each two of the spokes 5.

The two halves of each of said springs 14 are coiled reversely to each other, with a central portion connecting the two coils of each spring. The central portion of each spring is secured by a bolt 15 to the rim 10, and the inner ends of the two coils are each mounted on a stem 16, said stems being secured to and extending between the rings 11 and 12, with the springs adapted to operate expansively between said rings 11 and 12. Said springs retain the hub resiliently in suspension with the hub normally located concentric of the rims and the tire, but permitting the hub to have resilient movements within a limited degree both rotatably and radially.

Numeral 17 denotes the brake-drum, which is located on the reverse or inner face of the wheel, there being a cushion gasket 18 with which it contacts. The drum 17 and the gasket 18 are secured by the bolts 6 substantially as shown.

Numeral 19 denotes the inner disc, which together with the similar outer disc 20, incloses the spring mechanisms of the wheel. The disc 19 is placed between the cushion 18 and the brake drum where it is secured indirectly by the bolts 6, and it surrounds the hub-flange 4 so that the bolts 6 do not extend therethrough. Surrounding the hub 1 and contacting with the flange 3 is the cushion plate 21. The disc 20 contacts with the cushion-plate 21 but it is spaced from the hub 1. The outer edge of the disc 20 contacts with the outer flange of the rim 10, with the outer ring 22 in contact with the outer edge portion. The outer edge of the disc 20 and the ring 22 are secured to the rim 10 by means of a plurality of bolts 23. Also the disc 19 and its outer ring 24 are at the same time secured by the said bolts 23.

The outer end portion of the periphery of the hub 1 is threaded to receive the threaded ring 25, which holds in place the cap-plate 26. Secured to and surrounding the inner edge of the disc 20 is the ring 27, and contacting with the ring 27 is the flange 28 of the cap 29. The said flange 28 is detachably secured to the ring 27 by the screws 30.

It is to be understood that felt or other cushion gaskets are employed between all of the contacting movable parts, in order to eliminate friction and the escape of the lubricant.

It is also evident that my wheel is not to be limited to solid tires but the rim may be changed to adapt the wheel to various kinds of tires as desired.

It can now be seen that the hub 1, with its flanges 3 and 4, the spokes 5, and the rings 11 and 12, together with the enclosing parts thereto attached, are carried by the several springs 14 whereby said parts may move resiliently with relation to the rims 8 and 10, and the tire 9, and in such manner as to afford all of the advantages of a pneumatically equipped wheel, but without the expense and trouble incident thereto.

It is evident that the weight of the vehicle and its load, which is carried by the wheels, will be supported by the axle and transmitted to the wheels, therefore the load will in fact be supported by the springs 14 by which it will be retained in suspension, the weight being equally divided between all of the springs, some of the springs supporting and others suspending the weight.

By this arrangement I attain practically universal movement of the hub, permitting the tire to travel forward and backward a considerable distance with relation to the hub without movement thereof, or vice versa, and also permitting the hub to be pressed a considerable distance out of concentric relation with outer rims of the wheel.

In practice this construction will cause the springs 14 to absorb practically all of the jars incident to travel over a roadway, and also to absorb the sudden jerks incident to starting and stopping the vehicle.

It is to be understood that various changes may be made in the several details of construction from that herein shown and described without departing from the spirit of the invention and without sacrificing any of the advantages thereof which are new and useful and which involve invention.

Having now fully shown and described my invention and the best means for its construction to me known at this time, what I claim and desire to secure by Letters Patent of the United States, is—

1. A vehicle wheel comprising in combination, a hub, spokes radiating from the hub, rings secured to the sides of the spokes toward the hub from the ends of the spokes and connecting all of the spokes near their outer ends, a channeled rim located outward from the ends of the spokes and in which the outer end portions of all of the spokes are loosely located, a double coil-spring located between each two of said spokes, means for securing the central portion of the springs to said rim, means for mounting each coil of each of said springs on a stem, means for connecting said stems to said rings whereby said hub is retained resiliently in suspension, an inner disc, and an outer disc, means for securing said discs to said rim whereby they will extend inward toward the hub but spaced therefrom and by which all of said springs are enclosed, substantially as shown and described and for the purposes set forth.

2. A vehicle wheel comprising in combination, a hub, spokes radiating from the hub, rings secured on the sides of the outer portions of the spokes and concentric with the hub, a flanged inner rim with the ends of the spokes located between the flanges of said rim, a plurality of double-coil springs each secured at a point between its two coils to said inner rim, an outer rim surrounding the inner rim, a stem carried by the inner convolution of each coil of each spring, means for mounting said stems between said rings to be carried thereby, and discs secured to the inner rim enclosing the parts mentioned which are between the hub and the outer rim, all substantially as shown and described.

In testimony whereof I have hereunto subscribed my name to this specification in the presence of two subscribing witnesses.

THOMAS J. FLAHIE.

Witnesses:
WALTER E. GRANT,
DANIEL ENGLE.